(12) United States Patent
Dalpizzol et al.

(10) Patent No.: US 6,811,207 B2
(45) Date of Patent: Nov. 2, 2004

(54) MOTOR VEHICLE DOOR ASSEMBLY WITH CANOPY ASSEMBLY

(75) Inventors: Jim Dalpizzol, Sterling Heights, MI (US); Keith Riha, Rochester, MI (US)

(73) Assignee: Textron Automotive Company, Inc., Troy, MI (US)

( * ) Notice: Subject to any disclaimer, the term of this patent is extended or adjusted under 35 U.S.C. 154(b) by 0 days.

(21) Appl. No.: 10/398,324

(22) PCT Filed: Sep. 28, 2001

(86) PCT No.: PCT/US01/30332

§ 371 (c)(1),
(2), (4) Date: Apr. 3, 2003

(87) PCT Pub. No.: WO02/30711

PCT Pub. Date: Apr. 18, 2002

(65) Prior Publication Data

US 2004/0000800 A1 Jan. 1, 2004

Related U.S. Application Data

(60) Provisional application No. 60/238,954, filed on Oct. 10, 2000.

(51) Int. Cl.[7] .................................................. B60J 7/00
(52) U.S. Cl. ..................... 296/139; 296/146.8; 296/163; 135/88.01
(58) Field of Search .................... 296/97.8, 99.1, 296/139, 146.1, 143, 163, 152, 146.8; 135/88.01, 88.05, 88.07, 88.09, 88.1, 88.11, 903

(56) References Cited

U.S. PATENT DOCUMENTS

| | | | | |
|---|---|---|---|---|
| 2,532,989 A | * | 12/1950 | Biondi | 296/99.1 |
| 3,720,438 A | * | 3/1973 | Johnson et al. | 296/163 |
| 3,743,345 A | * | 7/1973 | Eckman et al. | 296/163 |
| 4,201,412 A | * | 5/1980 | Williams et al. | 296/163 |
| 4,355,834 A | * | 10/1982 | Alford | 296/163 |
| 4,457,553 A | * | 7/1984 | Larkin | 296/163 |
| 5,287,871 A | * | 2/1994 | Trice | 135/88.05 |
| 5,417,469 A | * | 5/1995 | Hammond | 296/163 |
| 5,476,302 A | | 12/1995 | Ronci | 296/99.1 |
| 5,660,425 A | * | 8/1997 | Weber | 296/163 |
| 5,820,189 A | | 10/1998 | Tew | 296/26 |
| 5,921,259 A | | 7/1999 | Ehler | 135/88.14 |
| 6,006,809 A | | 12/1999 | Williams et al. | 160/46 |
| 6,044,856 A | * | 4/2000 | Cano | 296/152 |

* cited by examiner

*Primary Examiner*—Lori L. Coletta
(74) *Attorney, Agent, or Firm*—Grossman, Tucker, Perreault & Pfleger, PLLC

(57) ABSTRACT

A motor vehicle (2) including a door assembly (4) configured to provide support for a canopy assembly (12) attached to the door assembly. The canopy assembly includes a canopy (18) and at least one canopy support member (20 and 22).

20 Claims, 5 Drawing Sheets

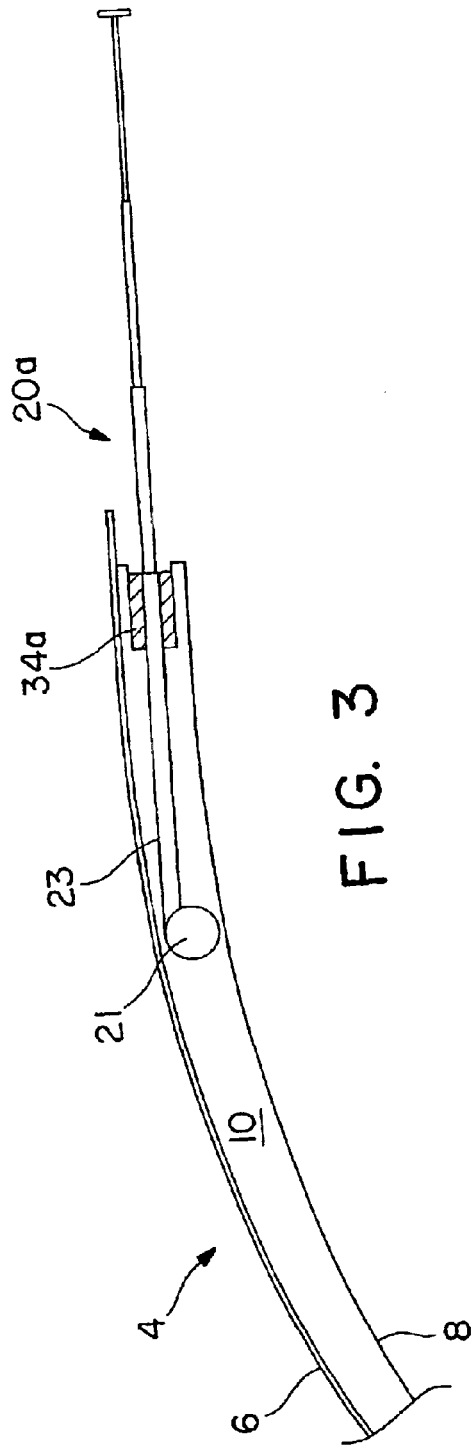
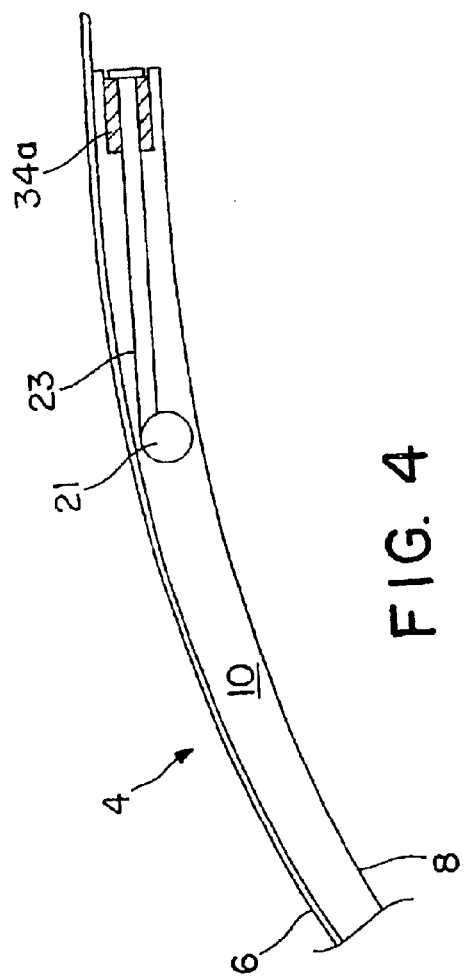

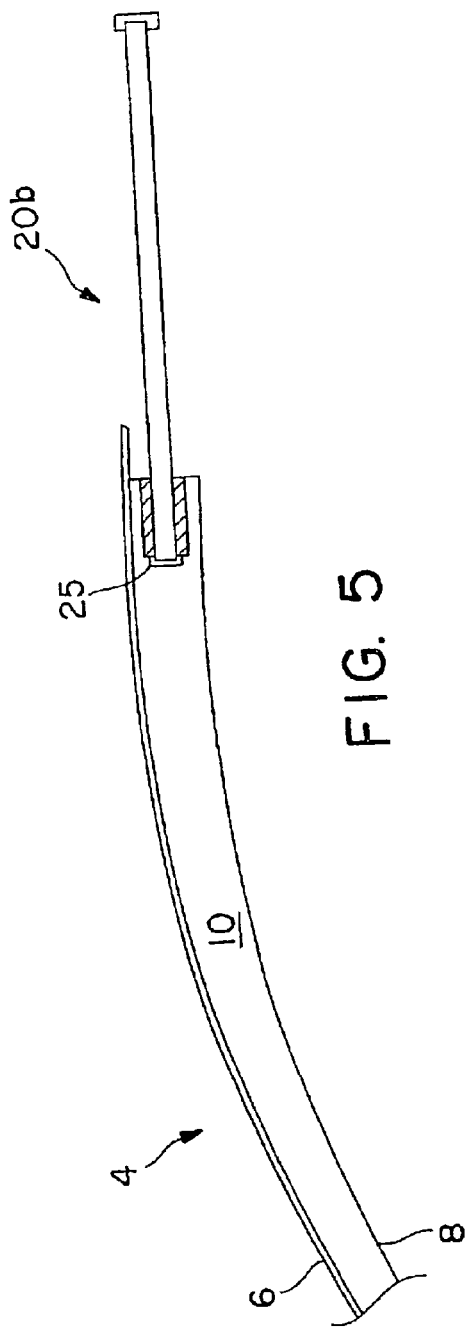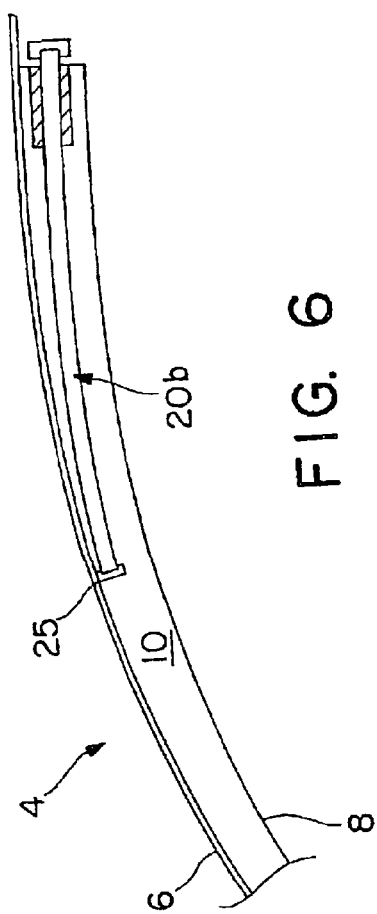

MOTOR VEHICLE DOOR ASSEMBLY WITH CANOPY ASSEMBLY

CROSS REFERENCE TO RELATED APPLICATIONS

This application is a U.S. national stage completion of International Application No. PCT/US01/30332 filed Sep. 28, 2001, and published Apr. 18, 2002 as International Publication No. WO 02/30711, designating the United States, and which claims benefit of U.S. Provisional Application No. 60/238,954 filed Oct. 10, 2000.

FIELD OF THE INVENTION

This invention relates generally to a motor vehicle door assembly which supports a canopy assembly attached thereto and, more particularly, to a door assembly which contains the canopy assembly therein.

BACKGROUND OF THE INVENTION

Minivans and sport-utility vehicles (SUVs) all have rear doors, generically called tailgates, which provide access to the vehicle's rear cargo area through a rear cargo opening. In some vehicles, a pair of doors are vertically hinged at the two sides of the vehicle rear cargo opening to open horizontally. In other vehicles, a single door is hinged at one side of the vehicle rear cargo opening to open horizontally. In still other vehicles, a pair of doors are horizontally hinged at the top and bottom of the rear cargo opening to open vertically up and down like a clamshell.

More recently, in order to increase accessibility to the rear cargo area, the rear of many vehicles have been equipped with a single door, or so called "liftgate", which is pivotally attached by horizontal hinges at the top of the rear cargo opening. To gain access to the cargo area, these liftgates commonly pivot upwardly and outwardly from the cargo opening.

Due to their large cargo areas, minivans and SUVs are often used to transport foodstuffs, coolers, folding chairs, folding tables and other accessories to family picnics and other outings, such as so called "tailgate" parties before and after sporting events. Often the use of a canopy is desirable at such an event to offer shade from sun rays or cover from rain. Unfortunately, the use of canopies for such protection at such events is difficult given their large transportation size, as well as the time required to assemble and disassemble such a device. Furthermore, the space for the canopy to occupy is typically limited to the space rearward of the motor vehicle given that other motor vehicles are customarily parked parallel to one another, thus preventing the canopy from being used to the side of the vehicle.

What is needed is a canopy assembly which may be attached to the structure of a motor vehicle which makes transportation of such a device simpler than the transportation of separate canopies. What is also needed is a canopy assembly which may be quickly assembled and dissembled. What is also needed is a canopy assembly which is configured to occupy the space rearward of a motor vehicle.

BRIEF DESCRIPTION OF THE DRAWINGS

To better understand and appreciate the invention, refer to the following detailed description in connection with the accompanying drawings:

FIG. 3 is a partial cross-sectional view of the rear door assembly and a second embodiment of a canopy support member in an extended position taken along line 2—2 of FIG. 1;

FIG. 4 is a partial cross-sectional view of the rear door assembly and the second embodiment of a canopy support member in a retracted position taken along line 2—2 of FIG. 1;

FIG. 5 is a partial cross-sectional view of the rear door assembly and a third embodiment of a canopy support member in an extended position taken along line 2—2 of FIG. 1;

FIG. 6 is a partial cross-sectional view of the rear door assembly and the third embodiment of a canopy support member in a retracted position taken along line 2—2 of FIG. 1;

FIG. 7 is a partial cross-sectional view of a canopy support member and the canopy taken along line 7—7 of FIG. 1;

The above and other objects, features, and advantages of the present invention will be apparent in the following detailed description when read in conjunction with the drawings wherein the same reference characters denote the same or similar parts throughout the several views.

DETAILED DESCRIPTION OF THE INVENTION

Figure 1:
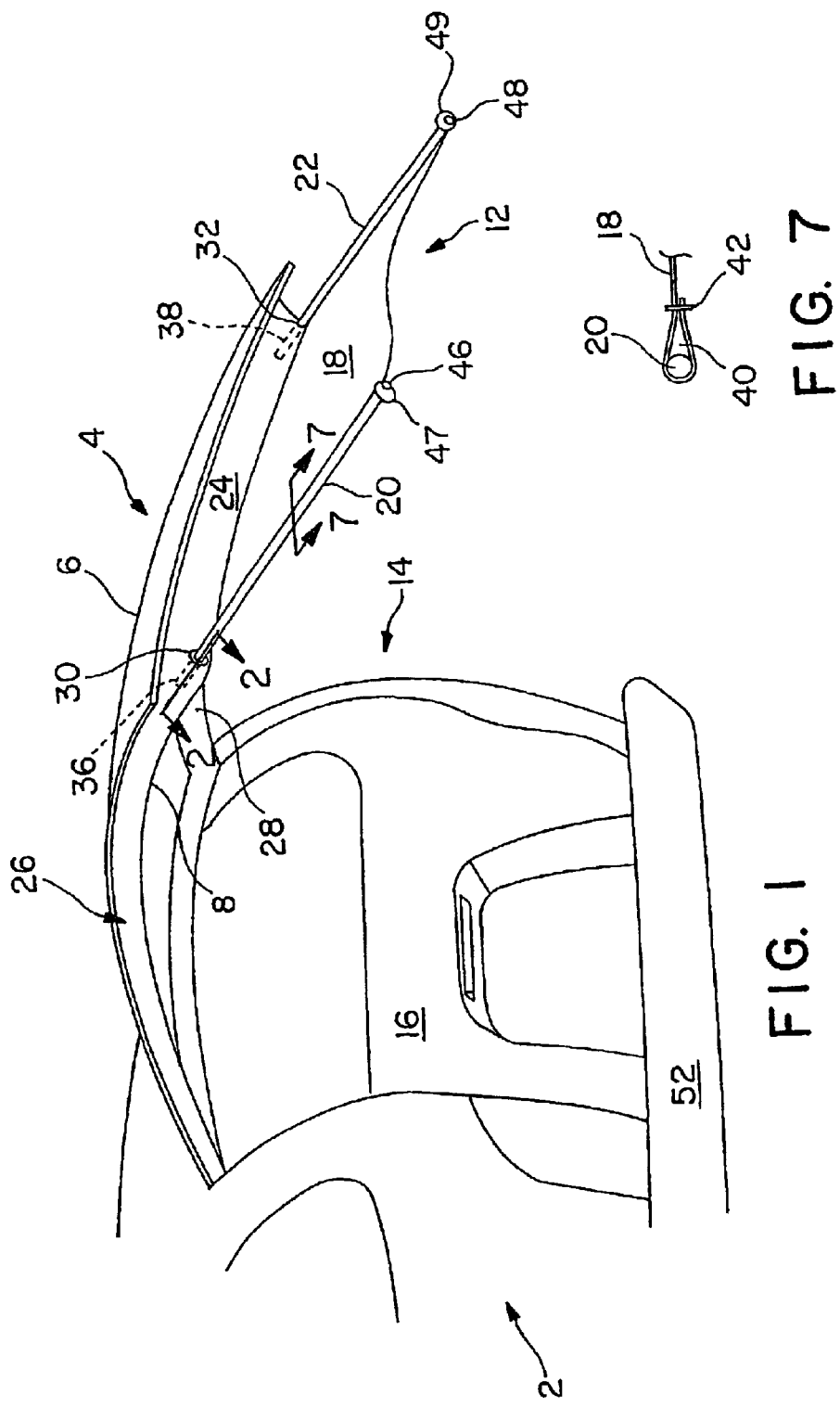
FIG. 1 is a perspective view of a rear door assembly of a motor vehicle with a canopy assembly attached thereto.
Figure 2:
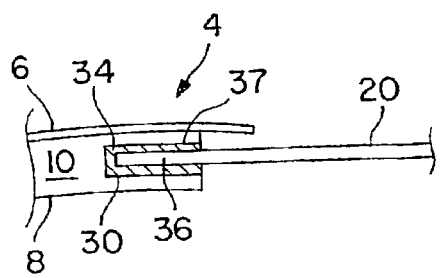
FIG. 2 is a partial cross-sectional view of the rear door assembly with a first embodiment of a canopy support member taken along line 2—2 of FIG. 1.

As best shown in FIG. 1, a motor vehicle is illustrated at 2. As shown, motor vehicle 2 is a minivan. Motor vehicle 2 may also comprise, but is not limited to, a sport utility vehicle. Motor vehicle 2 includes a rear door assembly 4. Rear door assembly 4 includes an outer panel 6 and an inner panel 8 spaced laterally from one another to define an interior cavity 10 there between, as shown in FIG. 2. When rear door assembly 4 is in its open position, a rear cargo opening 14 is provided to assess a rear cargo area 16. Preferably, rear door assembly 4 is pivotally attached to motor vehicle 2 by horizontal hinges locate at the top of the rear cargo opening 14.

As shown in FIG. 1, rear door assembly 4 includes a first exemplary embodiment of a canopy assembly 12 attached thereto. In this manner, rear door assembly 4 is configured to provide support for the cantilevered canopy assembly 12. Also as shown in FIG. 1, canopy assembly 12 is in its utilization position. In other words, a position in which the canopy 18 of the canopy assembly 12 covers objects is located beneath the canopy 18. For example, canopy 18 may be used to cover objects, including pedestrians, chairs, tables and foodstuffs, to provide shelter from moving objects, either falling or flying (e.g. rain, sun rays, snow, insects, etc.).

As shown in FIG. 1, canopy assembly 12 includes a canopy 18 and two canopy support members 20 and 22 in their extended positions. Preferably, canopy 18 is disposed between the canopy support members 20, 22 and also attached to rear door assembly 4 by canopy support members 20, 22. As shown, preferably canopy support members 20, 22 attach to rear door assembly 4 along lower side portion 24 and are laterally displaced from one another by the approximate cross-car width of canopy 18. However, canopy support member 20, 22 may be attached to any other portion of the Tear door assembly 4 including left or right vertical side portions 26 and 28.

Canopy support members 20, 22 preferably comprise a columnar shape such as a shaft. The distal ends 46, 48 of canopy support members 20, 22 may be provided with canopy retention members 47, 49 which impede removal of the canopy 18 from the canopy support members 20, 22 by wind, for example.

As shown in FIG. 1, a portion 36, 38 of the canopy support members 20, 22 are inserted, generally with a manual insertion force, into circular receptacles 30, 32, respectively, in rear door assembly 4 for attachment to the rear door assembly 4. As shown in FIG. 2, receptacle 30 (which is in the same as receptacle 32) preferably comprises a fastening device 34. As shown, fastening device 34 comprises a bushing with a blind hole 37 (i.e. a hole that does not pass completely through the bushing). Preferably the bushing is made of compressible material, such as rubber, which forms an interference fit around the inserted portions 36, 38 of canopy support members 20, 22.

In addition to providing attachment of canopy support members 20, 22 to rear door assembly 4, fastening device 34 also provides detachable attachment of the canopy support members 20, 22 from the fastening device 34. Such release of the canopy support members 20, 22 from the fastening device 34 after insertion and attachment is necessary to enable subsequent closure of rear door assembly 4 without damage to the canopy support members 20, 22 after their use. Canopy support members 20, 22 are detached from fastening device 34 by preferably applying a manual retraction force to the exposed portions of the canopy support members 20, 22 which overcomes the force of the interference fit, thus detaching the canopy support members 20, 22 from the fastening device 34.

In order to reduce assembly and disassembly associated with the above embodiment, as well as potential damage to the canopy support members 20, 22 after their use, in other embodiments preferably canopy support members 20, 22 retract into a storage position and are contained within interior cavity 10 of rear door assembly 4 when rear door assembly 4 is in a closed position or when canopy assembly 12 is not in use. In such a manner, in addition to being protected from damage, the canopy support members 20, 22 are also concealed from the view when rear door assembly 4 is in a closed position or when canopy assembly 12 is not in use.

In another embodiment of the invention, in order to enable retraction into interior cavity 10 of rear door assembly 4, canopy support members 20, 22 may be telescopic. When canopy support members 20, 22 are telescopic, they may be formed from, but are not limited to, metal or plastic. An exemplary telescopic canopy support member 20a is illustrated in FIGS. 3 and 4 in its extended and retracted positions, respectively. As shown, telescopic canopy support member 20a is attached to rear door assembly by fastening device 34a. However, unlike fastening device 34, fastening device 34a does not have to provide for detachable attachment of the telescopic support member 20a from rear door assembly 4 after each use since telescopic support member 20a is merely retracted. Consequently, fastening device 34a may comprise any suitable fastening device including, but not limited to, threaded fasteners, brackets, and welds.

As shown in FIGS. 3 and 4, telescopic canopy member 20a may be moved between its extended and retracted positions by an electrical motor 21 and contained in a separate housing 23 within interior cavity 10. However, telescopic canopy member 20a may also be moved manually between its extended and retracted positions, or not be contained within a separate housing 23 within interior cavity 10.

In another embodiment of the invention, in order to enable retraction into interior cavity 10 of rear door assembly 4, canopy support member 20, 22 may also be bendable to the contour of interior cavity 10. When canopy support members 20, 22 are bendable, they may be formed from, but are not limited to, metal or plastic. An exemplary bendable canopy support member 20b is illustrated in FIGS. 5 and 6 in its extended and retracted positions, respectively. In its extended position in FIG. 5, bendable canopy support member 20b is illustrated as being straight. However, in its retracted position in FIG. 6, a portion of bendable canopy support member curves in response to contact with the inner surface of outer panel 6, thus conforming to the shape of interior cavity 10. Unlike the previous embodiments, canopy support member 20b preferably has a stop member 25 attached thereto to prevent inadvertent removal from rear door assembly 4 when extended for use.

In various embodiments of the invention, canopy 18 may comprise a fabric and/or a film. Where canopy 18 comprises a fabric, it may be composed of natural or synthetic, organic or inorganic fibers. An example of canopy 18 comprising a fabric is canvas. Where canopy 18 comprises a film, it may be a tinted film or a reflective film. In either case, preferably canopy 18 is water resistant and, more preferably, waterproof.

In various embodiments of the invention, canopy 18 may attached to canopy support members 20, 22, as shown in FIG. 7, by a loop 40 formed in the canopy 18 along its length which is held closed by a stitch 42. In this manner, canopy 18 may engage the loop 40 simply by sliding canopy support members 20, 22 within, the confines of the loop 40 or, conversely, disengage the loop 40 simply by sliding the canopy support members 20, 22 from the confines of the loop 40. In this manner, upon removal of the canopy 18 from one of the canopy support members 20, 22, the canopy 18 may be wrapped around the remaining support member and preferably retracted along with the canopy support member 20 or 22 into interior cavity 10, whichever the case may be, for storage. Furthermore, the canopy support member around which the canopy 18 is wrapped may comprise a canopy retraction mechanism which may be, for example, spring loaded for the purpose of retracting the canopy 18 and wrapping it around the canopy support member.

In various embodiments of the invention, canopy 18 may be attached to canopy support members 20, 22 by any number of attachment configurations including, but not limited to, mechanical fasteners (e.g. clips, screws, hook and loop), adhesives, rope, knots, folds, etc.

Figure 8:
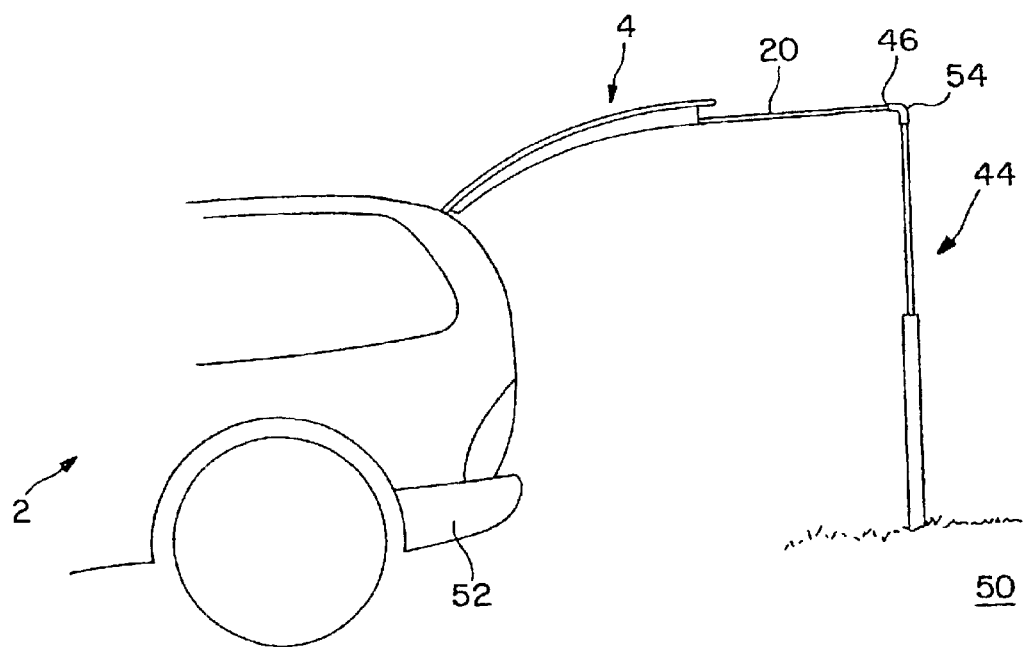
FIG. 8 is a side view of the rear door assembly and canopy assembly including a reinforcement post.

In another embodiment of the invention, canopy assembly 12 may also comprise one or more reinforcement posts 44, as shown in FIG. 8, which preferably are configured to be attachable, either directly or indirectly, to the distal ends 46, 48 of canopy support members 20, 22, respectively, and extend to a resting surface 50, such as the ground or a portion of the motor vehicle 2 such as bumper 52. Similar to canopy support members 20, 22, the reinforcement post 44 may be telescopic.

As shown in FIG. 8, reinforcement post 44 is substantially perpendicular with respect to canopy support members 20. Reinforcement post 44 is preferably attached to the distal ends 46, 48 of canopy support members 20, 22 indirectly through a hinging device 54. Preferably hinging device 54 enables reinforcement post 44 to be folded to a position substantially parallel with canopy support members 20, 22 for the purposes of storage. Furthermore, preferably interior cavity 10 is adapted to contain reinforcement post 44 within in addition to canopy support members 20, 22 and canopy 18.

Figure 9:
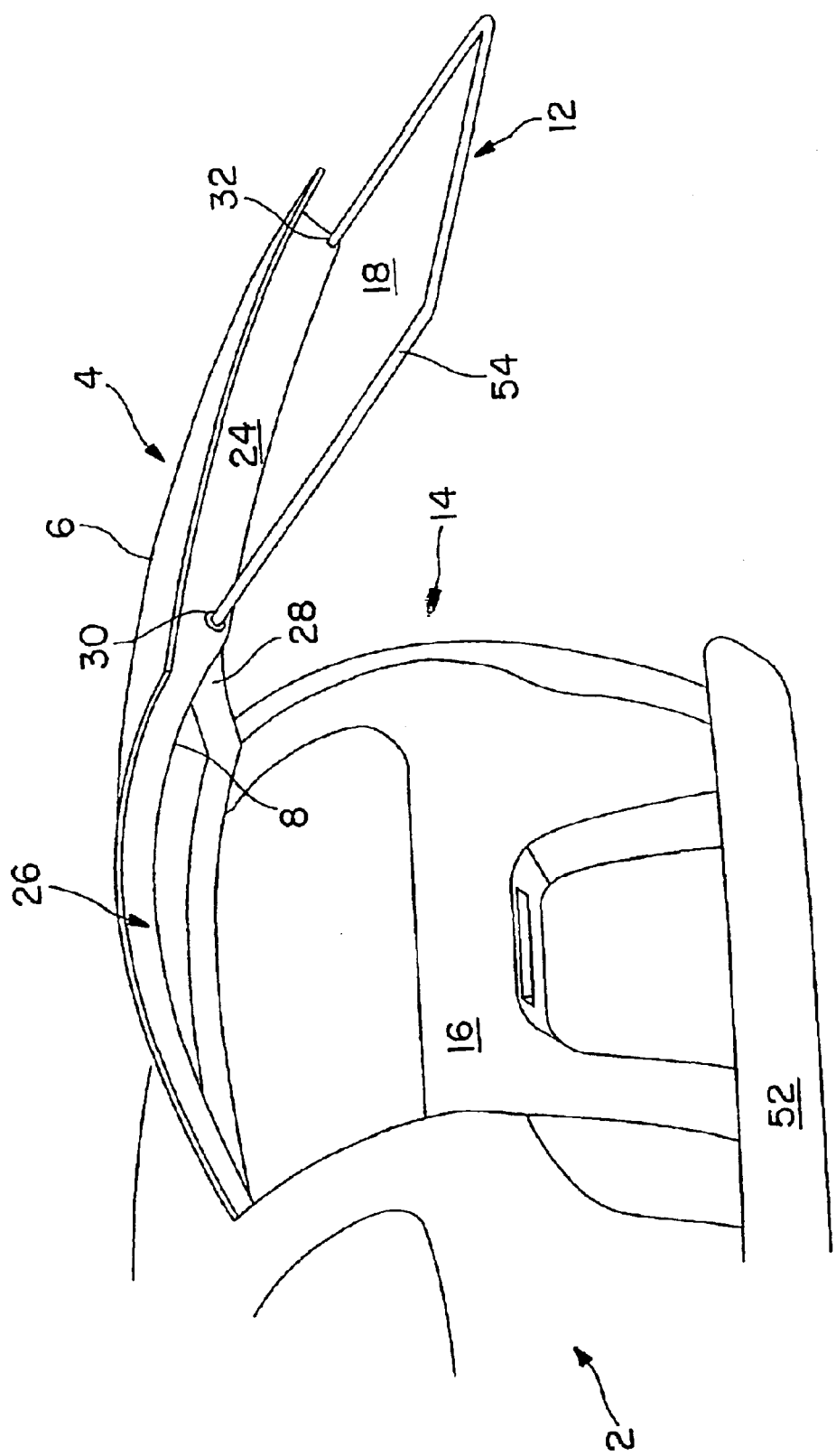
FIG. 9 is perspective view of a rear door assembly of the motor vehicle with another embodiment of the canopy assembly attached thereto.

In another embodiment of the invention as shown in FIG. 9, canopy assembly 12 may comprise a single U-shaped canopy support member 54 rather than the two canopy support members 20, 22 illustrated in other embodiments.

In still other embodiments of the invention, motor vehicle 2 may be provided with a retaining device, such as an electric circuit or mechanical lock-out, which prevents closure of the rear door assembly 4 when canopy assembly 12 is in its utilization position or when a canopy support member is in its extended position, thus preventing possible damage to the canopy assembly 12 if rear door assembly 4 was inadvertently closed.

Thus, it is seen that the invention provides a canopy assembly which is incorporated into the structure of a motor vehicle which makes transportation of such a device simpler that the transportation of separate canopies. In addition, the invention also provides a canopy assembly which may be quickly assembled and dissembled. Furthermore, the invention provides a canopy assembly which is configured to occupy the space rearward of a motor vehicle.

The description and drawings illustratively set forth our presently preferred invention embodiments. We intend the description and drawings to describe these embodiments and not to limit the scope of the invention. Those skilled in the art will appreciate that still other modifications and variations of the present invention are possible in light of the above teaching while remaining within the scope of the following claims. Therefore, within the scope of the claims, one may practice the invention otherwise than as the description and drawings specifically show and describe.

We claim:

1. A motor vehicle comprising:
 a door assembly, including a lower side portion, the door assembly configured to provide support for a canopy assembly attached to the door assembly, the canopy assembly comprising a canopy and at least one canopy support member wherein the door assembly is configured to provide support for the canopy assembly attached along the lower side portion of the door assembly.

2. The motor vehicle of claim 1 wherein the door assembly is configured to provide support for the canopy assembly attached along either left or right vertical side portions of the door assembly.

3. A motor vehicle comprising:
 a door assembly, the door assembly configured for the attachment of a canopy assembly, the canopy assembly comprising a canopy and at least one canopy support member wherein the door assembly includes a receptacle for receiving a portion of the canopy support member therein and wherein the receptacle comprises a fastening device for attachment of the canopy support member to the door assembly.

4. The motor vehicle of claim 3 wherein the door assembly includes a fastening device for attachment of the canopy support member to the door assembly.

5. The motor vehicle of claim 4 wherein the fastening device provides detachable attachment of the canopy support member from the fastening device.

6. The motor vehicle of claim 3 wherein the fastening device provides detachable attachment of the canopy support member from the fastening device.

7. The motor vehicle of claim 3 wherein the door assembly includes a fastening device configured to retain at least a portion of the canopy support member when the door assembly is in an open position and configured to release the canopy support member before the door assembly is in a closed position.

8. The motor vehicle of claim 3 wherein the door assembly includes a receptacle configured to contain at least a portion of the canopy support member when the door assembly is in an open position and configured to release the canopy support member before the door assembly is in a closed position.

9. The motor vehicle of claim 3 wherein the door assembly includes an interior cavity, the interior cavity configured to contain at least a portion of the canopy assembly.

10. The motor vehicle of claim 9 wherein the interior cavity is configured to store at least a portion of the canopy support member or the canopy when the door assembly is in a closed position.

11. The motor vehicle of claim 9 wherein the interior cavity is configured to enable the canopy support member to be in a retracted position when the door assembly is in a closed position and to be in an extended position when the door assembly is in an opened position.

12. The motor vehicle of claim 4 wherein the canopy support member is telescopic.

13. The motor vehicle of claim 3 wherein the canopy support member is bendable.

14. The motor vehicle of claim 3 wherein the canopy assembly further comprises at least one reinforcement post.

15. The motor vehicle of claim 14 wherein the reinforcement post is attached to the canopy support member.

16. The motor vehicle of claim 15 wherein the reinforcement post is attached to the canopy support member by a hinging device.

17. The motor vehicle of claim 3 wherein the canopy assembly comprises two canopy support members, the canopy support members substantially parallel and displaced laterally cross-car, the canopy spanning the lateral distance between the canopy support members and attached to the canopy support members.

18. The motor vehicle of claim 3 wherein the door assembly contains a motor for retracting and extending the canopy support member.

19. The motor vehicle of claim 3 further comprising a retaining device which prevents closure of the door assembly when the canopy assembly is in its utilization position.

20. The motor vehicle of claim 3 further comprising a retaining device which prevents closure of the door assembly when the canopy support member is in an extended position.

* * * * *